United States Patent [19]

Aoyama

[11] Patent Number: 5,115,789

[45] Date of Patent: May 26, 1992

[54] DIRECT INJECTION DIESEL ENGINE

[75] Inventor: Shunichi Aoyama, Yokohama, Japan

[73] Assignee: Nissan Motor Co., Ltd., Japan

[21] Appl. No.: 744,584

[22] Filed: Aug. 14, 1991

[30] Foreign Application Priority Data

Aug. 16, 1990 [JP] Japan ................................. 2-216165

[51] Int. Cl.[5] ..................... F02M 25/07; F02M 45/02; F02B 3/08
[52] U.S. Cl. ..................... 123/569; 123/299; 123/302
[58] Field of Search ............... 123/299, 300, 302, 304, 123/305, 315, 376, 378, 569

[56] References Cited

U.S. PATENT DOCUMENTS

| | | | |
|---|---|---|---|
| 2,001,358 | 5/1935 | Guernsey | 123/302 X |
| 3,395,690 | 8/1968 | Riley | 123/302 X |
| 4,369,753 | 1/1983 | Sugiyama | 123/569 |
| 4,453,379 | 6/1984 | Kawamura et al. | 123/569 X |
| 4,546,739 | 10/1985 | Nakajima et al. | 123/299 |
| 4,624,228 | 11/1986 | Sahara et al. | 123/569 X |
| 4,727,848 | 3/1988 | Stumpp et al. | 123/569 |
| 4,920,937 | 5/1990 | Sasaki et al. | 123/302 X |
| 4,974,565 | 12/1990 | Hashimoto et al. | 123/299 |

FOREIGN PATENT DOCUMENTS 61-160271 7/1986 Japan.
61-162572 7/1986 Japan.

Primary Examiner—Willis R. Wolfe
Attorney, Agent, or Firm—Lowe, Price, LeBlanc & Becker

[57] ABSTRACT

A diesel engine having a combustion chamber formed by a cylinder and piston where fuel is injected into the chamber directly, provided with a device to recycle part of the exhaust gas is recycled into the air intake depending on the running condition of the engine, a fuel injection valve which lifts in two stages depending on the fuel pressure, two air intake valves and two exhaust valves disposed around the injection valve. The injection valve is fitted substantially parallel to the cylinder axis facing the center of the combustion chamber and provided with a needle valve which lifts in two stages depending on the fuel pressure in order to spray fuel from an injection nozzle according to the lift of the needle valve. This needle valve is provided with a guide which slides on the inner circumference of the injection nozzle so as to guide the needle valve concentrically with respect to the injection nozzle. The fuel spray into the combustion chamber is thereby rendered uniform, mixing of fuel and air is promoted, and the emission of both NOx and smoke is reduced.

7 Claims, 7 Drawing Sheets

DIRECT INJECTION DIESEL ENGINE

FIELD OF THE INVENTION

This invention relates to a direct injection diesel engine provided with an exhaust gas recirculation system, and more particularly to a method of reducing emission of smoke when exhaust gas is recycled.

BACKGROUND OF THE INVENTION

Exhaust gas recirculation systems (referred to hereafter as EGR systems), wherein part of the exhaust gas from an engine is recycled in the air intake to reduce peak temperature and pressure in the combustion chamber, are a recognized means of reducing emission of NOx in the exhaust from direct injection diesel engines.

Although such EGR systems do reduce the amount of NOx generated, they also have the disadvantage that generation of smoke (particulate matter) tends to increase, since the recirculation of exhaust gas effectively reduces the oxygen concentration in the combustion chamber.

The fuel injection valves of diesel engines are generally fitted to the cylinder head at an oblique angle to avoid interference with air intake or exhaust valves. This however leads to uneven fuel injection inside the chamber so that air is used less efficiently where there is a high concentration of fuel, and more smoke is generated when exhaust gas is recycled.

A two stage fuel injection valve for diesel engines is disclosed in, for example, Jikkaisho No. 61-160271 and No. 61-162572 published by the Japanese Patent Office.

In this valve, a small amount of fuel is injected in an initial lift, and after this initial amount of fuel has ignited, a larger amount of fuel is injected in a second lift. This system was intended to reduce the ignition delay in the main fuel injection, help the the combustion flame to spread smoothly and rapidly throughout the chamber, reduce combustion noise and emission of NOx, and generate less smoke.

In this type of fuel injection valve however, if the needle valve is even slightly decentered in the initial injection when the injection pressure is low, the injection of fuel into the chamber is liable to be uneven, conversion of fuel to fine droplets is difficult where fuel is in high concentration, and as air is not used efficiently in the combustion, even more smoke may be generated.

Thus, even if an EGR system is combined with a two stage fuel injection valve and emission of NOx is decreased, smoke generation often increases. It was therefore difficult to reduce both NOx and smoke simultaneously.

SUMMARY OF THE INVENTION

It is an object of this invention to promote uniform mixing of fuel and air in the combustion chamber of direct injection diesel engines, and thereby to reduce generation of smoke when exhaust gas is recycled.

To achieve this object, this invention provides a diesel engine with a combustion chamber formed by a cylinder and piston where fuel is injected into the chamber directly, the engine comprising means for recycling part of the exhaust gas into the air intake depending on the running condition of the engine, a fuel injection valve fitted to the cylinder head of the cylinder substantially parallel to the cylinder axis and facing the center of the chamber which lifts in two stages depending on the fuel pressure, and two air intake valves and two exhaust valves disposed around the fuel injection valve.

The fuel injection valve is provided with a needle valve which is subjected in stages to the force of two return springs with different spring loads, fuel being injected from an injection nozzle when the needle valve lifts. The needle valve is also provided with a guide which slides on the inner circumference of the injection nozzle and which guides the needle valve such that it is concentrically disposed with respect to the injection nozzle.

DESCRIPTION OF THE PREFERRED EMBODIMENTS

Figure 1:
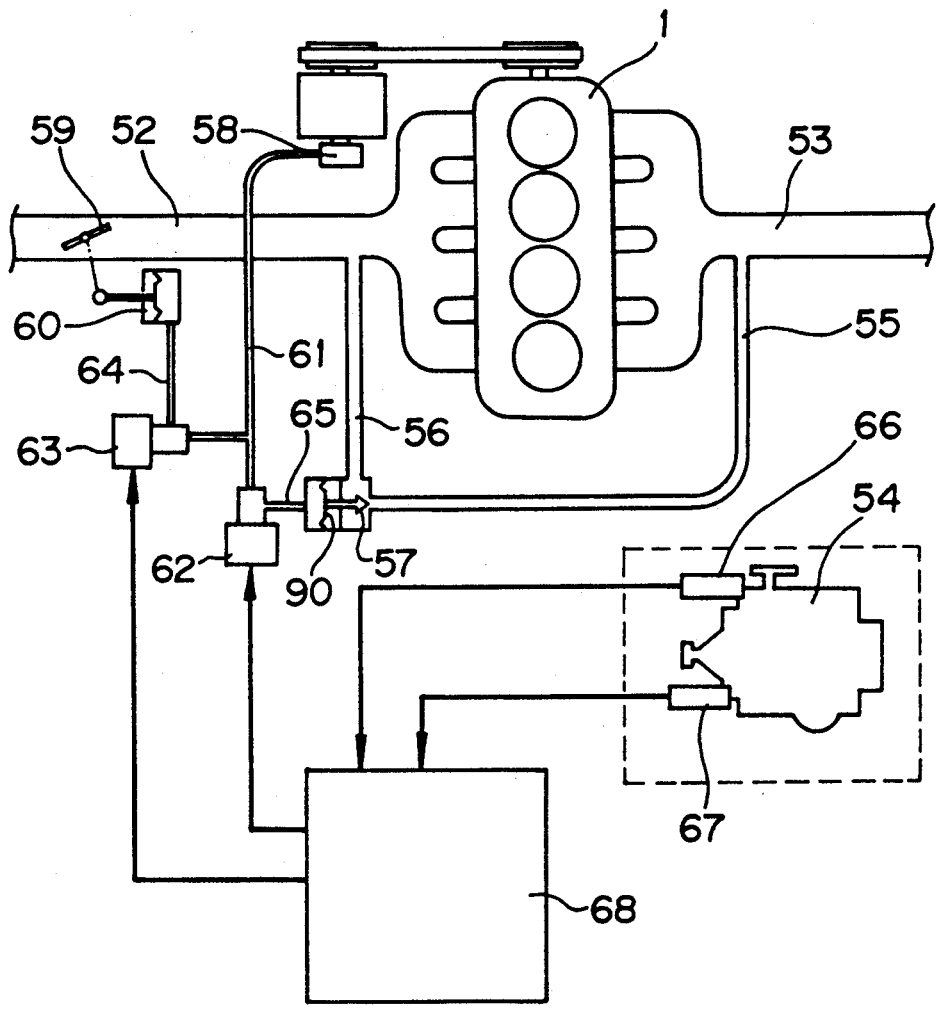
FIG. 1 is a schematic diagram of one preferred embodiment of this invention.

Referring to FIG. 1, a direct injection diesel engine 1 has an air intake manifold 52, an exhaust manifold 53 and a fuel injection pump 54.

Air intake manifold 52 and exhaust manifold 53 are connected each other via exhaust gas recirculation passages (hereafter referred to as EGR passages) 55 and 56, and an exhaust gas recirculation valve (referred to hereafter as an EGR valve) 57 is provided between these EGR passages 55 and 56. Opening and closing of the EGR valve 57 is controlled by a diaphragm 90 acting as a negative pressure actuator.

A throttle valve 59 which is driven by a diaphragm 60 acting as a negative pressure actuator, is also provided upstream of the confluence of the air intake manifold 52 and EGR passage 56. When the EGR valve 57 opens, exhaust gas is recycled, and the amount of gas recycled is increased by reducing the aperture of the throttle valve 59.

The diaphragm 90 acts under a negative pressure transmitted from a vacuum pump 58 driven by the engine 1 via a negative pressure passage 61, negative pressure control valve 62 and negative pressure passage 65.

The diaphragm 60 acts under a negative pressure from the negative pressure passage 61 via a negative pressure control valve 63 and negative pressure passage 64.

The pressure control valves 62 and 63 are connected by signal circuits to an electronic control unit 68, and control the negative pressures delivered to the diaphragms 90 and 60 respectively according to output signals from this control unit. The fuel injection pump 54 is equipped with a lever aperture sensor 66, which detects the aperture of the pump lever that controls the amount of fuel injected (engine load) concurrently with an accelerator pedal not shown, and an engine speed sensor 67 that detects engine speed. These sensors are both connected to the control unit 68 via signal circuits.

Figure 2:
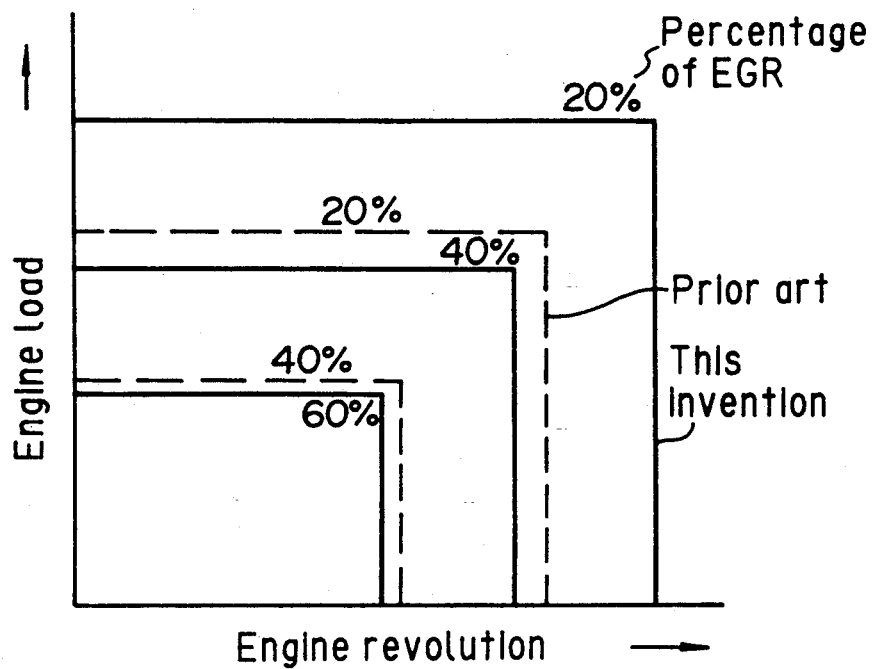
FIG. 2 is a control map of the amount of exhaust gas recycled which is set on the EGR system in the same embodiment.

The control unit 68 is provided with the EGR control map shown in FIG. 2. Based on input signals from the sensors 66 and 67, and on this EGR control map, the control unit 68 computes pressure control values and outputs them to the valves 62 and 63.

Figure 4:
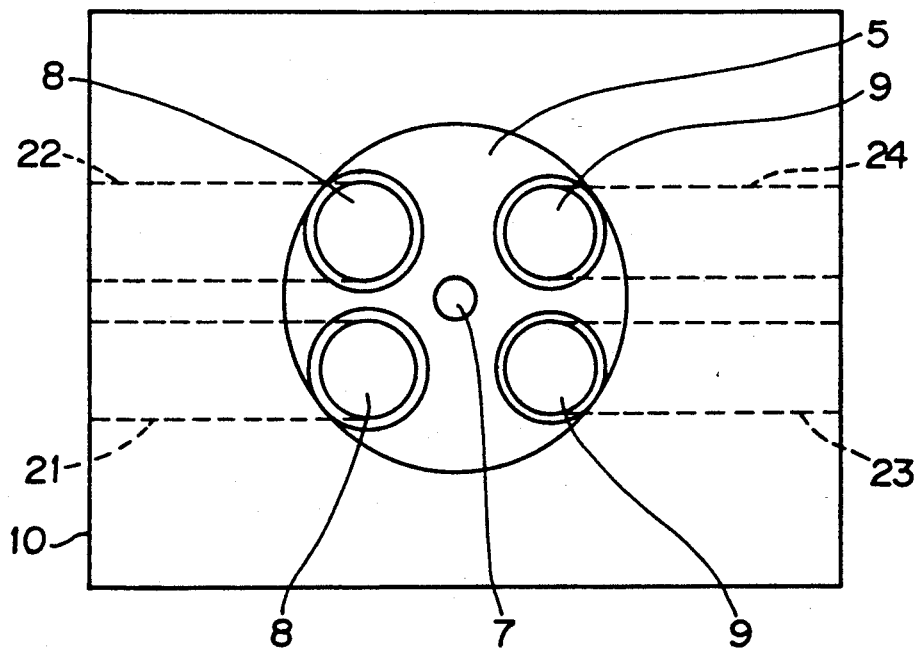
FIG. 4 shows a plan of the cylinder head as viewed from the cylinder in the same embodiment.
Figure 3:
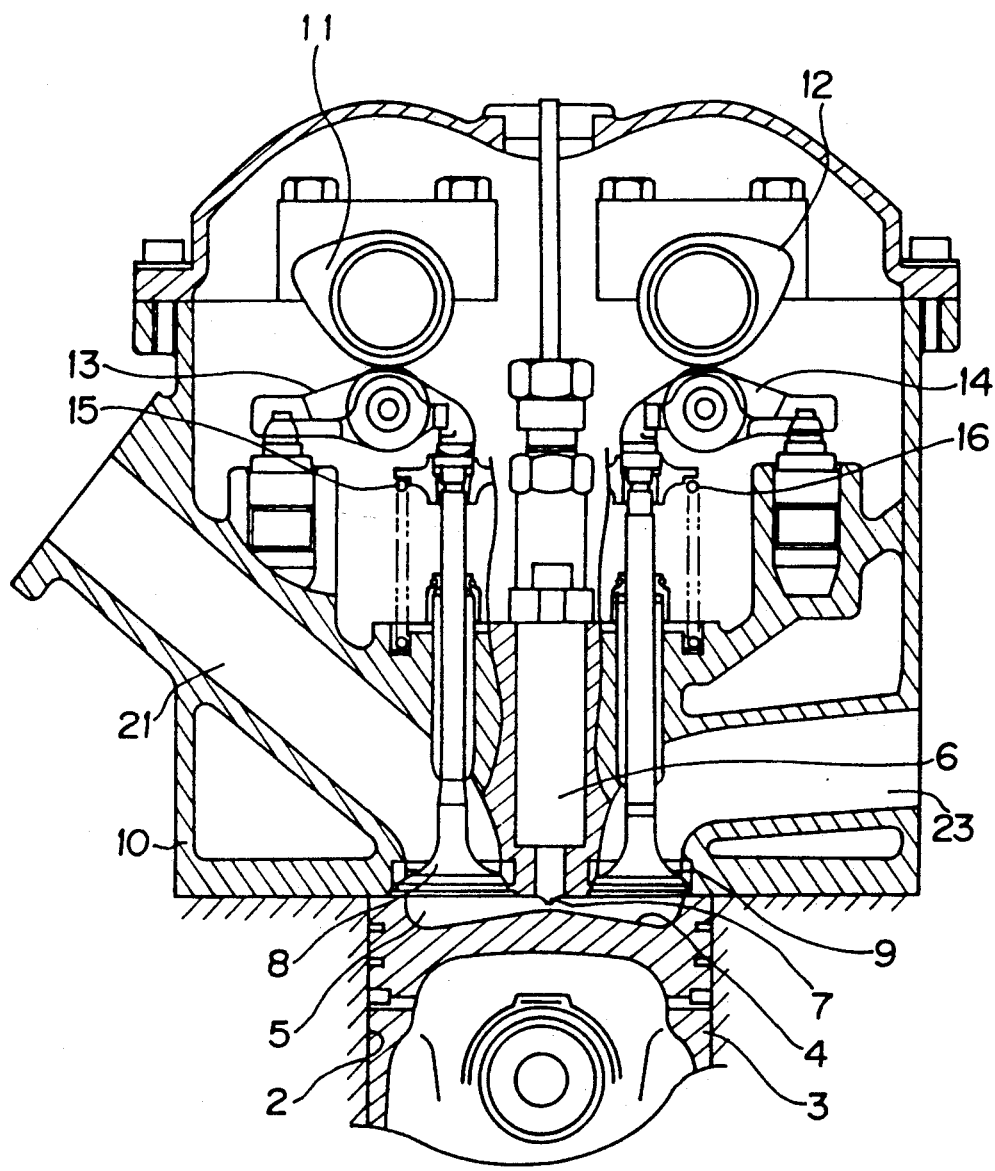
FIG. 3 shows a vertical section through the cylinder head and upper part of the cylinder in the engine of the same embodiment.

FIGS. 3 and 4 show the construction of the cylinder head 10 and upper part of the cylinder 2 in this diesel engine. A piston 3 is fitted such that it is free to slide in the cylinder 2, and a cavity 4 on the top of piston 3 forms a combustion chamber 5 in the cylinder 2.

A fuel injection valve 6 is provided in the center of cylinder head 10. This fuel injection valve 6 is disposed parallel to the center axis of the cylinder 2, and a fuel injection nozzle 7 at its tip is situated close to the center of the combustion chamber 5.

Two air intake valves 8 and two exhaust valves 9 are also disposed around the nozzle 7 in combustion chamber 5. These valves 8 and 9 are arranged parallel to the center axis of the cylinder 2.

Air intake ports 21, 22 connected to the valves 8, and exhaust ports 23, 24 connected to the valves 9, are also provided in the cylinder head 10.

The valves 8 and 9 are driven in opposition to valve springs 15 and 16 by rocker arms 13 and 14 supported such that they are free to oscillate in the cylinder head 10. Air intake cams 11 and exhaust cams 12 which rotate synchronously with the revolution of the engine are also provided in the upper part of the cylinder head 10. These cams 11 and 12 open and close the valves 8 and 9 with a specified timing in synchronization with the engine by pressing the rocker arms 13 and 14 down against the force of the valve springs 15 and 16.

Figure 5:
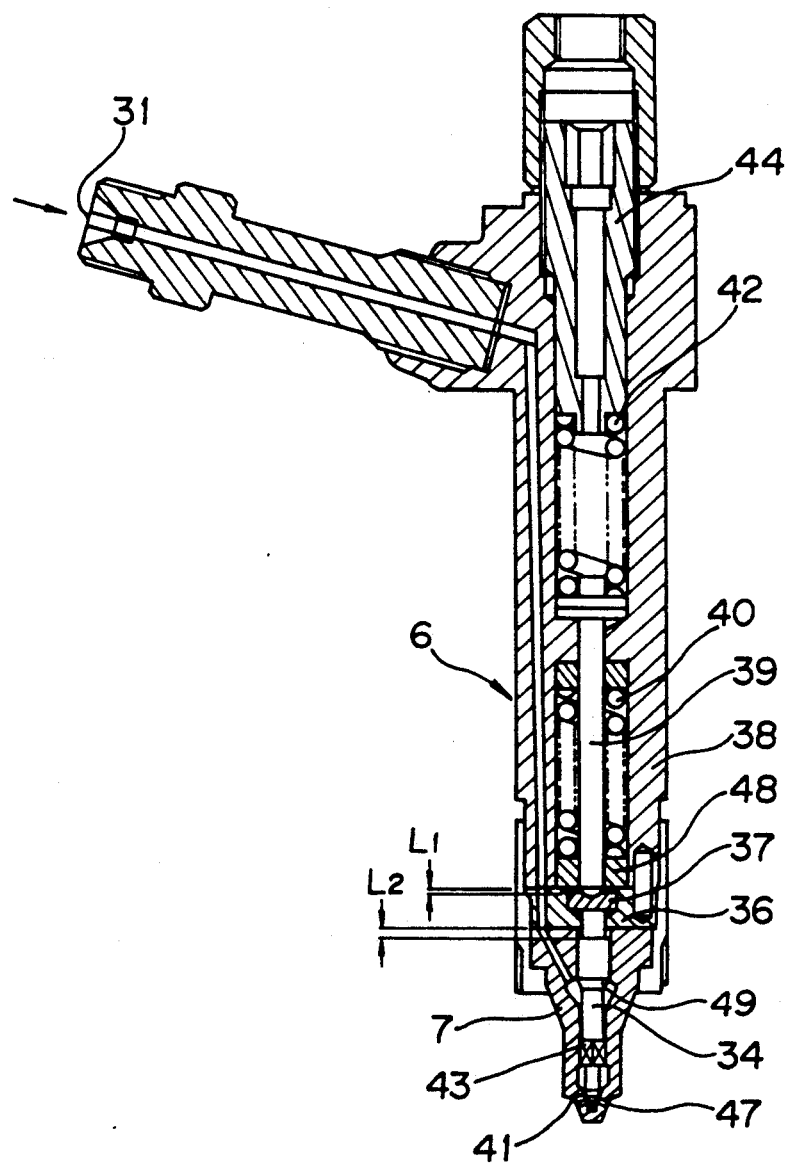
FIG. 5 shows a vertical section of the fuel injection valve in the same embodiment.
Figure 9:
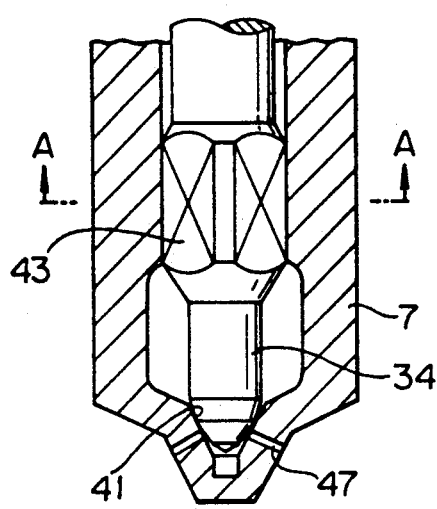
FIG. 9 is an enlarged view of the fuel injection nozzle in FIG. 5.
Figure 11:
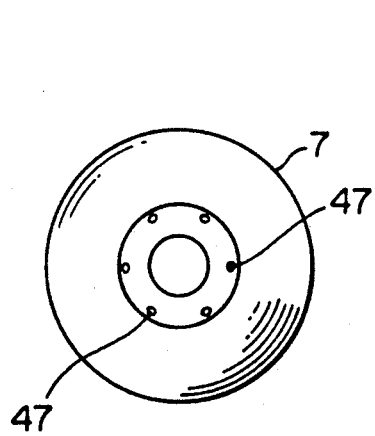
FIG. 11 is a front elevation of the fuel injection nozzle.
Figure 12:
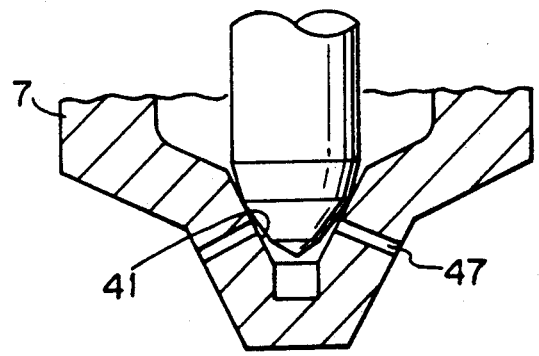
FIG. 12 is an enlarged view of a part of FIG. 9.

FIG. 5 shows the structure of the fuel injection valve 6. This valve 6 is provided with an injection nozzle 7, and a needle valve 34 seated in a seat 41 formed at the tip of the nozzle 7, as shown in FIGS. 9 and 12. A plurality of spray holes 47 as shown in FIG. 11 are formed in the seat 41 facing combustion chamber 5. These spray holes 47 open when the needle valve 34 lifts away from the seat 41, and spray fuel supplied from a fuel inlet 31 into the combustion chamber 5.

The spray holes 47, which are of equal surface area, are arranged radially in seat 41, spaced at equal intervals apart, and inclined at equal angles to the nozzle axis.

The injection nozzle 7 is arranged parallel to the axis of cylinder 2 in the center of the combustion chamber 5, and is provided with the above-mentioned spray holes 47. Fuel injected from near the center of the combustion chamber 5 is thus dispersed evenly throughout the chamber, its concentration is distributed evenly, and it mixes with air more effectively. Air is therefore utilized more efficiently in the combustion.

The needle valve 34 is supported by a first return spring 42 via a shim 37 housed in a nozzle holder 38 which holds the nozzle 7, and via a push rod 39. This needle valve 34 is provided with an outer skirt 49 of large diameter adjacent to a small chamber into which fuel is led from the inlet 31, and it moves upwards in an axial direction depending on the fuel pressure acting on the skirt 49. 36 is a stopper which adjusts the full lift of the valve 34, and 44 is a set screw which sets the spring load of the first return spring 42.

A spring seat 48 supported by a second return spring 40 is provided above the shim 37. The first return spring 42 and second return spring 40 have different spring loads.

The needle valve 34 is first lifted by the fuel pressure acting upon the skirt 49 until the shim 37 touches the spring seat 48 while compressing the first return spring 42, and an initial fuel injection takes place through the spray holes 47 for the duration of this initial lift $L_1$.

When the fuel pressure rises so that it exceeds the set load of the second return spring 40, the needle valve 34 begins to lift again while compressing the second return spring 40 via spring seat 48 in addition to the first return spring 42. The needle valve 34 continues to lift until it touches the stopper 36, and fuel is injected at high pressure through the spray holes 47 for the duration of this full lift $L_2$. The needle valve 34 therefore lifts in two stages. Initially, a small amount of fuel is injected, and a larger amount is then injected in a main injection. The effect of this is that, once the initial amount of fuel has ignited, the larger amount injected in the main injection can be burnt smoothly.

Figure 10:
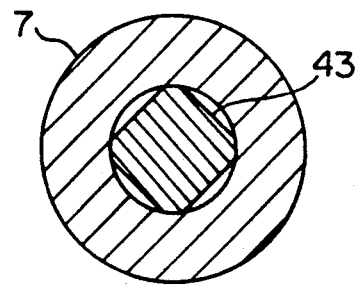
FIG. 10 is a cross sectional view of the fuel injection nozzle taken along the line A—A of FIG. 9.

A guide 43 which slides on the inner circumference of the injection nozzle 7 is provided on the needle valve 34. As shown in FIG. 10, this guide 43 has a passage which allows fuel to flow vertically up or down. Due to this guide 43, the valve 34 moves concentrically with respect to the injection nozzle 7, the cross section of the annular flow path produced between the needle valve 34 and seat 41 due to the lift of the valve is maintained uniform, and fuel is injected into the combustion chamber 5 more uniformly.

Figure 6:
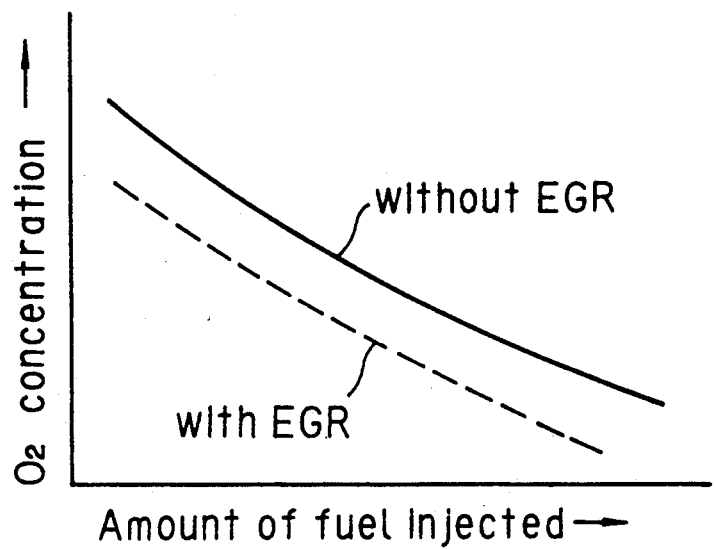
FIG. 6 is a graph showing the relation between amount of fuel injected and oxygen concentration in the combustion chamber.
Figure 7:
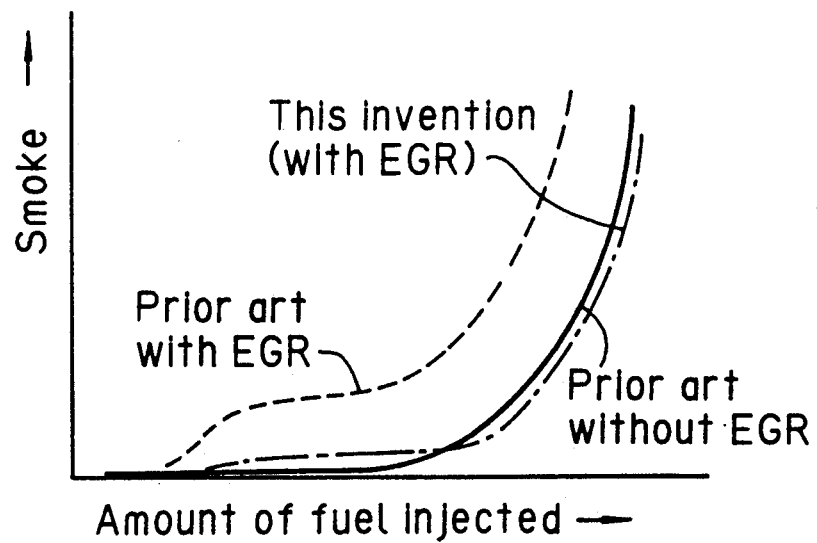
FIG. 7 is a graph showing the relation between amount of fuel injected and amount of smoke generated.

As shown in FIGS. 6 and 7, when exhaust gas is recycled, the $O_2$ concentration in the combustion chamber 5 falls and emission of smoke tends to increase. According to the present invention, however, the guide 43 renders the fuel injection uniform, and air is utilized more efficiently especially in the initial injection. As shown in FIG. 7 therefore, the smoke level when exhaust gas is recirculated is far lower than in prior art which are not provided with the guide 43.

Figure 8:
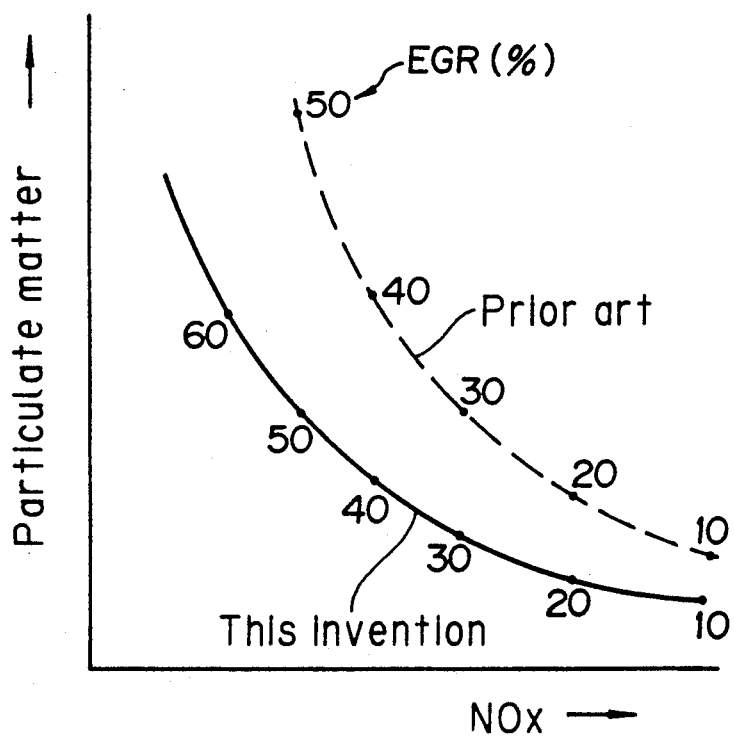
FIG. 8 is a graph showing the relation between amount of NOx and amount of particulate matter generated.

As shown in FIG. 2, the operating region in which EGR can be performed is thus enlarged, and a large amount of exhaust gas can be recycled even on partial load. The result, as shown in FIG. 8, is that both particulate matter and NOx are reduced.

By providing a guide 43 on the needle valve 34, the outer diameter of the injection nozzle 7 becomes fairly large. In engines which have one air intake valve and one exhaust valve per combustion chamber, therefore, the diameters of these valves can not be made large, to prevent them interfering with the injection nozzle, and it is difficult to maintain the requisite air intake and exhaust capacity.

According to the present invention, however, two air intake valves 8 and two exhaust valves 9 of small diameter are provided around the injection nozzle 7. It is therefore possible to retain sufficient installation space for the injection nozzle 7 and sufficient surface area for the valves 8 and 9, i.e., to provide sufficient air intake and exhaust capacity without interfering with the nozzle 7.

Further, in the initial lift of the injection valve 6, the gap between the tip of the needle valve 34 and the seat 41 is only of the order of 10–40 $\mu$m, and there is therefore a tendency to stick when the temperature rises. Cooling passages can however be provided between the air intake and exhaust valves 8 and 9 of the cylinder head 10 and on the outer surface of the injection nozzle 7 so that the cooling performance of the nozzle is increased, and the operating performance of the needle valve 34 is maintained.

The foregoing description of a preferred embodiment for the purpose of illustrating this invention is not to be considered as limiting or restricting the invention, since many modifications may be made by those skilled in the art without departing from the scope of the invention.

The embodiments of the invention in which an exclusive property or privilege is claimed are defined as follows:

1. A diesel engine having a combustion chamber formed by a cylinder and a piston into which high pressure fuel from a fuel injection pump is injected directly, comprising:
    means for recirculating part of the exhaust gas into the air intake depending on the running condition of the engine,
    a fuel injection valve supported in the cylinder head of said cylinder substantially parallel to the cylinder axis and facing the center of said combustion chamber wherein, by lifting a needle valve in two stages according to the fuel pressure, said high pressure fuel is injected in stages into the combustion chamber from the injection nozzle,
    a guide on said needle valve which slides on the inner circumference of said injection nozzle and guides said needle valve concentrically, and
    two air intake valves and two exhaust valves disposed symmetrically around the fuel injection nozzle.

2. A diesel engine as defined in claim 1 wherein said exhaust gas recirculating means comprises an exhaust gas recirculating passage connecting an air intake passage and an exhaust gas passage, an exhaust gas recirculation control valve inserted in this exhaust gas recirculating passage, an air intake throttle valve situated upstream of the confluence of said air intake passage and exhaust gas recirculating passage, and a control unit which opens and closes these valves according to the running condition of the engine.

3. A diesel engine as defined in claim 2 wherein said exhaust gas recirculation control valve and said air intake throttle valve are driven by negative pressure actuators.

4. A diesel engine as defined in claim 3 wherein said negative pressure actuators are driven by a negative pressure adjusted by a negative pressure valve controlled by a control unit, and wherein said exhaust gas recirculation control valve is opened and said air intake valve is throttled at least when the engine is running on partial load.

5. A diesel engine as defined in claim 1 wherein said air intake valves and exhaust valves are fitted parallel to the cylinder axis, and these air intake and exhaust valves are each connected to two air intake ports and two exhaust ports respectively.

6. A diesel engine as defined in claim 1 wherein said fuel injection valve is provided with a needle valve situated inside the injection nozzle, a first spring which acts on this needle valve in such a direction as to close it, a spring seat which adjusts the initial lift of said needle valve, and a second spring which acts on this spring seat in such a direction as to close said needle valve.

7. A diesel engine as defined in claim 6 wherein the seat supporting said needle valve formed in said injection nozzle, is provided with a plurality of spray holes of equal area which are disposed radially around the nozzle axis, spaced at equal intervals apart and inclined at equal angles to the nozzle axis.

* * * * *